(12) United States Patent
Chen et al.

(10) Patent No.: US 11,939,418 B2
(45) Date of Patent: Mar. 26, 2024

(54) PHOTO-CURABLE COMPOSITIONS

(71) Applicant: STRATASYS, INC., Eden Prairie, MN (US)

(72) Inventors: Liang Chen, Sewickley, PA (US); Alan D. Bushmire, Canonsburg, PA (US); Vahid Karimkhani, Pittsburgh, PA (US)

(73) Assignee: STRATASYS, INC., Eden Prairie, MN (US)

( * ) Notice: Subject to any disclaimer, the term of this patent is extended or adjusted under 35 U.S.C. 154(b) by 0 days.

(21) Appl. No.: 17/551,298

(22) Filed: Dec. 15, 2021

(65) Prior Publication Data

US 2023/0183411 A1  Jun. 15, 2023

(51) Int. Cl.
| | |
|---|---|
| *C08G 18/10* | (2006.01) |
| *B33Y 70/00* | (2020.01) |
| *C08G 18/32* | (2006.01) |
| *C08J 3/24* | (2006.01) |
| *C08J 3/28* | (2006.01) |

(52) U.S. Cl.
CPC .............. *C08G 18/10* (2013.01); *B33Y 70/00* (2014.12); *C08G 18/3221* (2013.01); *C08J 3/24* (2013.01); *C08J 3/28* (2013.01); *C08J 2375/06* (2013.01)

(58) Field of Classification Search
CPC .......... C08G 18/672; C08G 18/10; C08J 3/28
See application file for complete search history.

(56) References Cited

U.S. PATENT DOCUMENTS

| | | | |
|---|---|---|---|
| 5,416,880 A * | 5/1995 | Edwards ............... | C03C 25/326 65/447 |
| 9,504,632 B2 | 11/2016 | Naruse et al. | |
| 10,492,888 B2 | 12/2019 | Chen et al. | |
| 11,174,338 B2 | 11/2021 | Liska et al. | |
| 2011/0159285 A1 | 6/2011 | Choi et al. | |
| 2018/0072929 A1* | 3/2018 | Hu ....................... | C08G 18/672 |
| 2018/0194890 A1* | 7/2018 | Dubruel ............... | C09D 175/16 |

FOREIGN PATENT DOCUMENTS

| | | | |
|---|---|---|---|
| JP | WO2014-045782 | * | 3/2014 |
| WO | 20120157568 A1 | | 7/2014 |
| WO | 2020104873 A1 | | 5/2020 |
| WO | 2020131675 A1 | | 6/2020 |

OTHER PUBLICATIONS

Translation of JPWO2014-045782 (Year: 2014).*
Wenning, Christian, Reaction-Induced Phase Separation of PPG/PEO/HDI based bi-Soft Segment Polyurethanes, Inaugural Dissertation, University of Koln, 2018.
Zhao, Pei et al., Reaction induced phase separation in thermosetting/thermosetting blends: effects of imidazole content on the phase separation of benzoxazine/epoxy blends, RSC Advances, 2014, 4, pp. 61634-61642.
International Search Report, ISA/EP, PCT/US2022/081406, dated Mar. 27, 2023, 3 pages.
Written Opinion, ISA/EP, PCT/US2022/081406, dated Mar. 27, 2023, 5 pages.

* cited by examiner

*Primary Examiner* — Robert C Boyle
(74) *Attorney, Agent, or Firm* — Faegre Drinker Biddle & Reath LLP

(57) ABSTRACT

A photo-curable composition can include a photo-curable resin and a photoinitiator. The photo-curable composition can typically have a shear viscosity of less than 1 Pa·s at 100° C. at a shear rate of 50 s$^{-1}$ and can typically include a first prepolymer, a second prepolymer, and a reactive diluent.

20 Claims, No Drawings

PHOTO-CURABLE COMPOSITIONS

BACKGROUND

Photo-curable resins based on multifunctional (meth) acrylate monomers are commonly applied as thin films (e.g. protective coatings, printing inks) and are also used for the fabrication of bulk objects such as dental fillings and 3D-printed parts. Urethane (meth)acrylate (UA) prepolymers are particularly attractive for 3D-printing applications due to their outstanding flexibility, toughness, abrasion resistance, and weatherability, etc. Vinyl monomers are added to reduce the resin viscosity to improve the processability and/or modify the physical properties (e.g. thermal resistance, weatherability). Many factors affect the mechanical properties of crosslinked UA resin formulations including, for example (a) the ratio of hard and soft segments in UA prepolymer, (b) the molecular weight of prepolymer (c) the concentration and nature of reactive diluents, and (d) the curing process.

In many demanding applications of photo-cured resins, it is highly desirable to increase polymer toughness while maintaining good heat stability, which often requires the cured polymer to have a high glass transition temperature (Tg). Different approaches have been attempted to achieve these properties but have shown limited success. For example, photo-cured resins can achieve high toughness (e.g. high tensile strength and high elongation at break) but lack of thermal stability. Other photo-cured resins can achieve high heat stability but suffer from low toughness (e.g. low tensile elongation at break).

BRIEF SUMMARY

In one aspect, the present disclosure describes a photo-curable composition that can include a photo-curable resin and a photoinitiator. The photo-curable composition can typically have a shear viscosity of less than 1 Pa·s at 100° C. at a shear rate of 50 s$^{-1}$ and can typically include a first prepolymer, a second prepolymer, and a reactive diluent.

In another aspect, the present disclosure describes a crosslinked material including the photo-curable composition after curing.

In yet another aspect, the present disclosure describes a method of manufacturing a crosslinked material including exposing the photo-curable composition to polymerizing electromagnetic radiation.

There has thus been outlined, rather broadly, one or more features of invention so that the detailed description that follows may be better understood, and so that the present contribution to the art may be better appreciated. Other features of the present invention will become clearer from the following detailed description of the invention, taken with the accompanying claims, or may be learned by the practice of the invention.

DETAILED DESCRIPTION

Although the following detailed description contains many specifics for the purpose of illustration, a person of ordinary skill in the art will appreciate that many variations and alterations to the following details can be made and are considered to be included herein. Accordingly, the following embodiments are set forth without any loss of generality to, and without imposing limitations upon, any claims set forth. It is also to be understood that the terminology used herein is for the purpose of describing particular embodiments only, and is not intended to be limiting. Unless defined otherwise, all technical and scientific terms used herein have the same meaning as commonly understood by one of ordinary skill in the art to which this disclosure belongs.

As used in this written description, the singular forms "a," "an" and "the" include express support for plural referents unless the context clearly dictates otherwise. Thus, for example, reference to "a polymer" or "the polymer" can include a plurality of such polymers.

In this application, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the compositions nature or characteristics would be permissible if present under the "consisting essentially of" language, even though not expressly recited in a list of items following such terminology. When using an open ended term, like "comprising" or "including," in this written description it is understood that direct support should be afforded also to "consisting essentially of" language as well as "consisting of" language as if stated explicitly and vice versa.

The terms "first," "second," "third," "fourth," and the like in the description and in the claims, if any, are used for distinguishing between similar elements and not necessarily for describing a particular sequential or chronological order. It is to be understood that any terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of"

an ingredient or element may still actually contain such item as long as there is no measurable effect thereof.

As used herein, the term "about" is used to provide flexibility to a numerical range endpoint by providing that a given value may be "a little above" or "a little below" the endpoint. Unless otherwise stated, use of the term "about" in accordance with a specific number or numerical range should also be understood to provide support for such numerical terms or range without the term "about". For example, for the sake of convenience and brevity, a numerical range of "about 50 milligrams to about 80 milligrams" should also be understood to provide support for the range of "50 milligrams to 80 milligrams." Furthermore, it is to be understood that in this specification support for actual numerical values is provided even when the term "about" is used therewith. For example, the recitation of "about" 30 should be construed as not only providing support for values a little above and a little below 30, but also for the actual numerical value of 30 as well. Unless otherwise specified, all numerical parameters are to be understood as being prefaced and modified in all instances by the term "about," in which the numerical parameters possess the inherent variability characteristic of the underlying measurement techniques used to determine the numerical value of the parameter.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "1 to 5" should be interpreted to include not only the explicitly recited values of 1 to 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually.

This same principle applies to ranges reciting only one numerical value as a minimum or a maximum. Furthermore, such an interpretation should apply regardless of the breadth of the range or the characteristics being described.

Reference throughout this specification to "an example" means that a particular feature, structure, or characteristic described in connection with the example is included in at least one embodiment. Thus, appearances of the phrases "in an example" in various places throughout this specification are not necessarily all referring to the same embodiment.

EXAMPLE EMBODIMENTS

Photo-curable resin formulations can be used to fabricate complex objects, such as via 3D printing, for example. Within the formulation, urethane (meth)acrylate (UA) prepolymers can contribute to the toughness (e.g., high tensile strength and elongation at break) of the photo-cured compositions. Typically, UA prepolymers can be synthesized from a multi-functional polyol, a diisocyanate, and a hydroxy-functional (meth)acrylate. Alternatively, the UA prepolymer can be synthesized from a multi-functional polyol and an NCO-functional (meth)acrylate. Photo-cured UA prepolymers typically have a glass transition temperature (Tg) (e.g. <50° C.) associated with the structure of the polyurethane soft segment. Reactive diluents (e.g., high Tg (meth)acrylate monomers) can be combined with the UA prepolymers to provide tunable mechanical properties (e.g., modulus, elongation at break, for example) and to adjust suitable working temperatures for some demanding applications. In this approach, one typical challenge is that the resin toughness is quickly reduced due to reduction in tensile elongation when the reactive diluent content becomes the main component (e.g. >50 wt %) in the formulation.

Where UA prepolymers are synthesized using low molecular weight diols, the cured UA prepolymers often show high Tg and high modulus, but poor tensile elongation at break. In some cases, this may be due to the high crosslinking density of the polyurethane hard segment, such as when the molecular weight of the UA prepolymer is relatively low. In contrast, synthesizing UA prepolymers with higher molecular weights in order to improve the mechanical properties can lead to high viscosities that can be difficult to manage for many applications. In this approach, despite the possibility of toughening the composition containing hard segment prepolymers, the improvement of resin toughness (e.g. tensile elongation at break) is often limited.

In one aspect, the present disclosure is directed to photo-curable compositions with a manageable viscosity that can also provide a high Tg and good mechanical properties, and methods of manufacturing the same. The photo-curable composition can include a blend of a first prepolymer that has a high Tg after curing and a second prepolymer that has a low Tg after curing, where the cured composition has a microphase separated structure. In some examples, the first prepolymer can have a melting point of less than 60° C. In some examples, the second prepolymer can have a Tg of less than −40° C. In some additional examples, the photo-curable composition can further include a reactive diluent that is suitable as a solvent for both prepolymers.

Without wishing to be bound by theory, it is believed that the first prepolymer and the reactive diluent can form a high Tg crosslinked network as the main continuous phase that is co-crosslinked with a low Tg rubber network formed by the second prepolymer and the reactive diluent. The low Tg rubber network can be microphase separated from the high Tg crosslinked network to impact the toughness of the cured photo-curable composition while not strongly affecting the thermal stability of the main phase.

In contrast, where the high Tg network and low Tg network are miscible in the cured state, the soft phase can plasticize the high Tg phase leading to good tensile strength and high clarity, but a strong yield point and low tensile elongation at break. Conversely, where the high Tg network and the low Tg network are immiscible, resulting in macrophase separation in the cured state, the cured composition can have no yield point, but the mechanical properties and clarity can be compromised. Thus, the microphase separated composition can achieve a synergistic effect from the high Tg network and the low Tg network to achieve high modulus, yield point of >5% strain, high tensile strength, and good clarity while also maintaining good thermal stability.

For example, in some cases, a photo-curable composition with a microphase separated structure in the cured state can be achieved through polymerization-induced phase separation. This can be accomplished by balancing the molecular weight of the first prepolymer and the second prepolymer to facilitate homogenous mixing prior to curing, but where the soft phase is phase separated from the hard phase after curing due to incompatibility of those phases in the polymerized prepolymers.

Additionally, the miscibility between the two polymer networks is typically temperature dependent, where they typically become more miscible at elevated temperatures. Therefore, design considerations for a suitable photo-curable composition can include prepolymer structure, molecular weight, and comparable miscibility at the intended photo-cure temperatures.

In further detail, in some examples, the photo-curable composition can include a photo-curable resin and a photoinitiator. The photo-curable resin can typically include a first prepolymer, a second prepolymer, and a reactive diluent.

The first prepolymer can typically be present in the photo-curable resin in an amount of from 20 wt % to 60 wt % based on a total weight of the photo-curable resin. In some additional examples, the first prepolymer can be present in the photo-curable resin in an amount of from 30 wt % to 50 wt % based on a total weight of the photo-curable resin. In still additional examples, the first prepolymer can be present in the photo-curable resin in an amount of from 30 wt % to 40 wt %, from 35 wt % to 45 wt %, or from 40 wt % to 50 wt % based on a total weight of the photo-curable resin.

The first prepolymer can typically have a number average molecular weight of ≤2000 g/mol as determined by gel permeation chromatography employing polystyrene retention time standards. Generally, gel permeation chromatography is used to determine all molecular weight values disclosed herein, in each instance employing polystyrene retention time standards unless otherwise indicated. In some additional examples, the first prepolymer can have a number average molecular weight of ≤1800 g/mol. In yet additional examples, the first prepolymer can have a number average molecular weight of ≤1500 g/mol. In some further examples, the first prepolymer can have a number average molecular weight of ≤1200 g/mol, ≤1100 g/mol, ≤1000 g/mol, or ≤900 g/mol.

The first prepolymer can typically be a reaction product of a first reaction mixture including a cycloaliphatic diisocyanate, an isocyanate-reactive component, and a hydroxy-functional (meth)acrylate. A variety of cycloaliphatic diisocyanates can be included in the first reaction mixture. Non-limiting examples of cycloaliphatic diisocyanates can include cyclohexane-1,3-diisocyanate, cyclohexane-1,4-diisocyanate, 1-isocyanato-2-isocyanatomethyl cyclopentane, 1-isocyanato-3-isocyanatomethyl-3,5,5-trimethylcyclohexane (isophorone diisocyanate or IPDI), bis-(4-isocyanatocyclohexyl)-methane ($H_{12}MDI$), 1,3-bis(isocyanatomethyl)-cyclohexane, 1,4-bis(isocyanatomethyl)-cyclohexane, bis-(4-isocyanato-3-methyl-cyclohexyl) methane, 1-isocyanato-1-methyl-4(3)-isocyanatomethyl cyclohexane, 2,4-hexahydrotoluylene diisocyanate, 2,6-hexahydrotoluylene diisocyanate, the like, or a combination thereof. In some specific examples, the cycloaliphatic diisocyanate of the first reaction mixture can include IPDI, $H_{12}MDI$, or a combination thereof. In further examples, the cycloaliphatic diisocyanate of the first reaction mixture can include IPDI. In still further examples, the cycloaliphatic diisocyanate of the first reaction mixture can include $H_{12}MDI$.

In some examples, the first reaction mixture does not include an aromatic polyisocyanate or an aliphatic polyisocyanate other than the cycloaliphatic diisocyanate. In other examples, the first reaction mixture includes the cycloaliphatic diisocyanate in an amount of from 80 wt % to 100 wt %, from 90 wt % to 100 wt %, or from 95 wt % to 100 wt % based on a total weight of any polyisocyanate present in the first reaction mixture.

A variety of isocyanate-reactive components can also be included in the first reaction mixture. As used herein, "isocyanate-reactive component" refers to a component including a hydroxyl group, an amino group, a thiol group, or a combination thereof. The isocyanate-reactive component can typically have a functionality of 2, or greater than or equal to 2. Thus, the isocyanate-reactive component can be or include a variety of components, non-limiting examples of which can include polyols (e.g., diols, triols, etc.), polyamines (e.g., diamines, triamines, etc.), polythiols (e.g., dithiols, trithiols, etc.), the like, or a combination thereof. In some examples, the isocyanate-reactive component of the first reaction mixture can be or include a $C_2$-$C_{12}$ linear or branched aliphatic polyol, polyamine, polythiol, or a combination thereof. In some further examples, the isocyanate-reactive component of the first reaction mixture can be or include a $C_2$-$C_8$ linear or branched aliphatic polyol, polyamine, polythiol, or a combination thereof; a $C_4$-$C_{10}$ linear or branched aliphatic polyol, polyamine, polythiol, or a combination thereof; a $C_6$-$C_{12}$ linear or branched aliphatic polyol, polyamine, polythiol, or a combination thereof; or a mixture of any of these. In some specific examples, the isocyanate-reactive component of the first reaction mixture can be or include a $C_2$-$C_{12}$ linear or branched aliphatic polyol. In some further examples, the isocyanate-reactive component of the first reaction mixture can be or include a $C_2$-$C_8$ linear or branched aliphatic polyol, a $C_4$-$C_{10}$ linear or branched aliphatic polyol, a $C_6$-$C_{12}$ linear or branched aliphatic polyol, or a combination thereof. Non-limiting examples of isocyanate-reactive components can include ethylene glycol, 1,2-propanediol, 1,3-propanediol, glycerol, 1,3-butanediol, 2,3-butanediol, 1,4-butanediol, 2-methyl-1,4-butanediol, 3-methyl-1,3-butanediol, 1,2,4-butanetriol, 1,5-pentanediol, 3-methyl-1,5-pentanediol, 3-methyl-2,4-pentanediol, 2-methyl-1,3-pentanediol, 2-methyl-1,5-pentanediol, 1,2,5-pentanetriol, 1,6-hexanediol, 1,2-hexanediol, 1,5-hexanediol, 2-methyl-1,6-hexanediol, 4-methyl-1,3-hexanediol, 5-methyl-2,4-hexanediol, 3-methyl-1,6-hexanediol, 1,2,6-hexanetriol, 1,7-heptanediol, 2,5-heptanediol, 4-methyl-1,6-heptanediol, 3-methyl-2,4-heptanediol, 2-methyl-2,6-heptanediol, 5-methyl-2,4-heptanediol, 4-methyl-1,7-heptanediol, 1,2,7-heptanetriol, 1,8-octanediol, 2-methyl-1,8-octanediol, 7-methyl-1,7-octanediol, 6-methyl-1,7-octanediol, 3-methyl-1,4-octanediol, 1,2,8-octanediol, 1,9-nonanediol, 8-methyl-1-8-nonanediol, 1,2,9-nonanetriol, 1,10-decanediol, 2-methyl-1,10-decanediol, 2-methyl-2,5-decanediol, 4,8-Bis(hydroxymethyl)tricyclo [5.2.1.02,6]decane (DCPDM), 1,11-undecanediol, 1,12-dodecanediol, the like, or the corresponding polyamines thereof, or the corresponding polythiols thereof, or a combination thereof. In some specific examples, the isocyanate-reactive component can be or include 3-methyl-1,5-pentanediol. In some additional specific examples, the isocyanate-reactive component can be or include 1,4-butanediol. In some further specific examples, the isocyanate-reactive component can be or include DCPDM. In yet additional specific examples, the isocyanate-reactive component can be or include 1,9-nonanediol.

The cycloaliphatic diisocyanate and the isocyanate-reactive component can generally be combined in the first reaction mixture at an NCO/OH index of 1.2 to 3.0. It is noted that NCO/OH indexes are used throughout this disclosure for the sake of brevity, but these recitations are also intended to equivalently recite NCO/NH indexes or NCO/SH indexes, as appropriate for the particular situation. In some additional examples, the cycloaliphatic diisocyanate and the isocyanate-reactive component can be combined in the first reaction mixture at an NCO/OH index of from 1.3 to 2.3, from 1.5 to 2.5, or from 1.8 to 2.8. In some examples, the cycloaliphatic diisocyanate and the isocyanate-reactive component can be combined in the first reaction mixture prior to adding the hydroxy-functional (meth)acrylate to the first reaction mixture. In other examples, the cycloaliphatic diisocyanate, the isocyanate-reactive component, and the hydroxy-functional (meth)acrylate can be added contemporaneously to the first reaction mixture.

A variety of hydroxy-functional (meth)acrylates can be included in the first reaction mixture. The term "(meth)acrylate", as used herein, refers to the acrylate and/or the corresponding methacrylate. In some examples, the hydroxy-functional (meth)acrylate can be or include a $C_4$-$C_{10}$ hydroxyalkyl (meth)acrylate (i.e., a hydroxyalkyl (meth)acrylate including from 4 to 10 total carbon atoms). In some specific examples, the hydroxy-functional (meth)acrylate can be or include a $C_4$-$C_8$ hydroxyalkyl (meth)acrylate and/or a $C_6$-$C_{10}$ hydroxyalkyl (meth)acrylate. Non-limiting examples of hydroxy-functional (meth)acrylates can include hydroxymethyl acrylate, hydroxymethyl methacrylate, hydroxyethyl acrylate, hydroxyethyl methacrylate, hydroxypropyl acrylate, hydroxypropyl methacrylate, hydroxybutyl acrylate, hydroxybutyl methacrylate, hydroxypentyl acrylate, hydroxypentyl methacrylate, hydroxyhexyl acrylate, hydroxyhexyl methacrylate, the like, or a combination thereof. In some specific examples, the hydroxy-functional (meth)acrylate of the first reaction mixture can be or include hydroxyethyl acrylate and/or hydroxyethyl methacrylate. In some examples, the hydroxy-functional (meth)acrylate of the first reaction mixture can be or include hydroxyethyl acrylate. In some examples, the hydroxy-functional (meth)acrylate of the first reaction mixture can be or include hydroxyethyl methacrylate.

The second prepolymer can typically be present in the photo-curable resin in an amount of from 15 wt % to 40 wt % based on a total weight of the photo-curable resin. In some additional examples, the second prepolymer can be present in the photo-curable resin in an amount of from 20 wt % to 35 wt % or from 25 wt % to 30 wt % based on a total weight of the photo-curable resin. In still additional examples, the second prepolymer can be present in the photo-curable resin in an amount of from 15 wt % to 25 wt %, from 20 wt % to 30 wt %, or from 25 wt % to 35 wt % based on a total weight of the photo-curable resin.

The second prepolymer of the photo-curable resin can typically have a number average molecular weight of from 2000 g/mol to 10,000 g/mol as determined by gel permeation chromatography employing polystyrene retention time standards. In some additional examples, the second prepolymer can have a number average molecular weight of from 3000 g/mol to 8000 g/mol. In yet additional examples, the second prepolymer can have a number average molecular weight of from 2500 g/mol to 5000 g/mol. In some further examples, the second prepolymer can have a number average molecular weight of from 2000 g/mol to 4000 g/mol, from 2500 g/mol to 3500 g/mol, or from 3000 g/mol to 6000 g/mol.

The second prepolymer can be a reaction product of a second reaction mixture including a (meth)acrylate and a polyactive-hydrogen compound. A variety of second prepolymers can be included in the photo-curable resin. As non-limiting examples, the second prepolymer can be or include a di(meth)acrylate-functionalized polyactive-hydrogen compound (e.g., HEMA-PTMG-HEMA, as an illustrative example); a reaction product of a second reaction mixture including an isocyanate terminated (meth)acrylate and a polyactive-hydrogen compound; a reaction product of a second reaction mixture including a diisocyanate, a hydroxy-functional (meth)acrylate, and a polyactive-hydrogen compound; the like; or a combination thereof.

The second reaction mixture can include a variety of (meth)acrylates. In some examples, the (meth)acrylate of the second reaction mixture can be or include an isocyanate-terminated (meth)acrylate. In some additional examples, the (meth)acrylate of the second reaction mixture can be a hydroxy-functional (meth)acrylate. In some examples, the (meth)acrylate of the second reaction mixture can be or include a $C_4$-$C_{10}$ hydroxyalkyl (meth)acrylate. In some specific examples, the (meth)acrylate of the second reaction mixture can be or include a $C_4$-$C_8$ hydroxyalkyl (meth)acrylate and/or a $C_6$-$C_{10}$ hydroxyalkyl (meth)acrylate. Non-limiting examples of hydroxy-functional (meth)acrylates can include hydroxymethyl acrylate, hydroxymethyl methacrylate, hydroxyethyl acrylate, hydroxyethyl methacrylate, hydroxypropyl acrylate, hydroxypropyl methacrylate, hydroxybutyl acrylate, hydroxybutyl methacrylate, hydroxypentyl acrylate, hydroxypentyl methacrylate, hydroxyhexyl acrylate, hydroxyhexyl methacrylate, the like, or a combination thereof. In some specific examples, the hydroxy-functional (meth)acrylate of the second reaction mixture can be or include hydroxyethyl acrylate and/or hydroxyethyl methacrylate. In some examples, the hydroxy-functional (meth)acrylate of the second reaction mixture can be or include hydroxyethyl acrylate. In some examples, the hydroxy-functional (meth)acrylate of the second reaction mixture can be or include hydroxyethyl methacrylate.

The second reaction mixture can also include a variety of polyactive-hydrogen compounds. As used herein, "polyactive-hydrogen compound" refers to any compound including a plurality of Zerewitinoff-active hydrogen atoms. A "Zerewitinoff-active hydrogen" is referred to herein as an acidic hydrogen atom or an active hydrogen atom that can be identified using a known Zerewitinoff determination (e.g., by reactivity with a corresponding Grignard reagent). In some specific examples, the polyactive-hydrogen compound can be or include a polyol (e.g., a diol, a triol, etc.), a polyamine (e.g., a diamine, a triamine, etc.), a polythiol (e.g., a dithiol, a trithiol, etc.), or a combination thereof.

In some examples, the polyactive-hydrogen compound can have a number average molecular weight of from 1000 g/mol to 5000 g/mol as determined by gel permeation chromatography employing polystyrene retention time standards. In some additional examples, the polyactive-hydrogen compound can have a number average molecular weight of from 1200 g/mol to 4000 g/mol or from 1400 g/mol to 3000 g/mol. In some specific examples, the polyactive-hydrogen compound can have a number average molecular weight of from 1000 g/mol to 1500 g/mol, from 1200 g/mol to 2000 g/mol, from 1500 g/mol to 2500 g/mol, from 2000 g/mol to 3000 g/mol, or from 2500 g/mol to 3500 g/mol.

In some examples, the polyactive hydrogen compound can have a Hansen solubility parameter of $\delta < 18.9$ $MPa^{1/2}$. In some additional examples, the polyactive hydrogen compound can have a Hansen solubility parameter of $\delta > 16$ $MPa^{1/2}$ to $\delta < 18.9$ $MPa^{1/2}$. Hansen has described the total solubility parameter, $\delta$, as the combination of three components reflecting dispersive ($\delta D$), polar ($\delta P$), and hydrogen bond (δH) interactions: $\delta^2 = \delta^2_{TOT} = \delta D^2 + \delta P^2 + \delta H^2$. The components δD, δP, and δH are named Hansen Solubility Parameters, HSP. Hansen also defined a 3D solubility diagram (δD, δP, δH) where a solubility sphere having a radius Ro can be defined for large molecules. The analysis of polymer HSP can be determined based on solubilization tests in solvents of known HSP, with a sphere that encompasses the good solvents of the component in the space, as described in appendix A in Hansen Solubility Parameters, A User Guidebook, 2007, CRC Press. For example, based on the described solubilization tests, it has been determined that Desmophen 1200 has a total δ of 21.6 $MPa^{1/2}$, PTMG has a total δ of 17.6 $MPa^{1/2}$, and PPG has a total δ of 18.9 $MPa^{1/2}$.

In some additional examples, the second reaction mixture can include a diisocyanate. Where a diisocyanate is included in the second reaction mixture, the diisocyanate can generally include a cycloaliphatic diisocyanate, an aromatic diisocyanate, or a combination thereof. In some examples, the diisocyanate of the second reaction mixture can be or include a cycloaliphatic diisocyanate. Where this is the case, the cycloaliphatic diisocyanate can be or include cyclohexane-1,3-diisocyanate, cyclohexane-1,4-diisocyanate, 1-isocyanato-2-isocyanatomethyl cyclopentane, IPDI, $H_{12}$MDI, 1,3-bis(isocyanatomethyl)-cyclohexane, 1,4-bis(isocyanatomethyl)-cyclohexane, bis-(4-isocyanato-3-methyl-cyclohexyl)methane, 1-isocyanato-1-methyl-4(3)-isocyanatomethyl cyclohexane, 2,4-hexahydrotoluylene diisocyanate, 2,6-hexahydrotoluylene diisocyanate, the like, or a combination thereof. In some specific examples, the cycloaliphatic diisocyanate of the second reaction mixture can include IPDI, $H_{12}$MDI, or a combination thereof. In further examples, the cycloaliphatic diisocyanate of the second reaction mixture can include IPDI. In still further examples, the cycloaliphatic diisocyanate of the second reaction mixture can include $H_{12}$MDI. In other examples, the diisocyanate of the second reaction mixture can be or include an aromatic diisocyanate. Where this is the case, the aromatic diisocyanate of the second reaction mixture can be or include methylene diphenyl diisocyanate (MDI) (e.g., 2,4'-MDI, 4,4'-MDI, or a mixture thereof, for example), toluene diisocyanate (TDI) (e.g., 2,4-TDI, 2,6-TDI, or a mixture thereof, for example), or a combination thereof. In some examples, the aromatic diisocyanate of the second reaction mixture can be or include MDI.

Where the second reaction mixture includes a diisocyanate, the diisocyanate and the polyactive-hydrogen compound can generally be combined in the second reaction mixture at an NCO/OH index of 1.2 to 3.0. In some additional examples, the diisocyanate and the polyactive-hydrogen compound can be combined in the second reaction mixture at an NCO/OH index of from 1.3 to 2.3, from 1.5 to 2.5, or from 1.8 to 2.8. In some specific examples, the diisocyanate and the polyactive-hydrogen compound can be combined in the second reaction mixture at an NCO/OH index of 2.

The photo-curable resin can also include a reactive diluent. The reactive diluent can typically be present in the photo-curable resin in an amount of from 20 wt % to 65 wt % based on a total weight of the photo-curable resin. In some additional examples, the reactive diluent can be present in the photo-curable resin in an amount of from 30 wt % to 50 wt % or from 40 wt % to 60 wt % based on a total weight of the photo-curable resin. In still additional examples, the reactive diluent can be present in the photo-curable resin in an amount of from 25 wt % to 35 wt %, from 35 wt % to 45 wt %, or from 40 wt % to 50 wt % based on a total weight of the photo-curable resin.

A variety of reactive diluents can be included in the photo-curable resin. In some examples, the reactive diluent can be or include a $C_{10}$-$C_{18}$ (meth)acrylate monomer. Non-limiting examples of $C_{10}$-$C_{18}$ (meth)acrylate monomers can include isobornyl acrylate, isobornyl methacrylate, cyclohexyl methacrylate, cis-4-tert-butyl-cyclohexylmethacrylate, 4-tert-butylcyclohexyl methacrylate, 3,3,5-trimethylcyclohexyl acrylate, 3,3,5-trimethylcyclohexyl methacrylate, dicyclopentanyl acrylate, dicyclopentanyl methacrylate, 3,5-dimethyl-1-adamantyl acrylate, 3,5-dimethyl-1-adamantyl methacrylate, tert-butyl methacrylate, 2-decahydronapthyl methacrylate, 1-adamantyl acrylate, 1-adamantyl methacrylate, 2-ethylhexyl methacrylate, 3-tetracyclo[4.4.0.1.1]dodecyl methacrylate, tetrahydrofurfuryl methacrylate, 2-phenoxyethyl methacrylate, N-vinyl pyrrolidone, carboxyethyl acrylate, acryloyl morpholine, the like, or a combination thereof.

In addition to the photo-curable resin, the photo-curable composition can also include a photoinitiator. A variety of photoinitiators can be included in the photo-curable composition. Non-limiting examples can include IRGACURE and DAROCUR from BASF, or the like, such as 1-hydroxy-cyclohexyl phenyl ketone (IRGACURE 184), 2,2-dimethoxy-1,2-diphenylethan-1-one (IRGACURE 651), bis(2,4,6-trimethylbenzoyl)phenylphosphineoxide (IRGACURE 819), 1-14-(2-hydroxyethoxy)phenyl]-2-hydroxy-2-methyl-1-propane-1-one (IRGACURE 2959), 2-benzyl-2-dimethylamino-1-(4-morpholinophenyl)butanone (IRGACURE 369), 2-methyl-1-14-(methylthio)phenyl1 morpholinopropan-1-one (IRGACURE 907), Oligo[2-hydroxy-2-methyl-1-[4-(1-methylvinyl)phenyl]propanone] (ESACURE ONE), 2-hydroxy-2-methyl-1-phenyl propan one (DAROCUR 1173), 2,4,6-trimethylbenzoyldiphenylphosphine oxide (IRGACURE TPO), and 2,4,6-trimethylbenzoylphenyl phosphinate (IRGACURE TPO-L), the like, or a combination thereof. Additional non-limiting examples of photoinitiators can include, benzyl dimethyl ketal, 2-methyl-2-hydroxypropiophenone, benzoin methyl ether, benzoin isopropyl ether, anisoin methyl ether, aromatic sulfonyl chlorides, photoactive oximes, the like, or a combination thereof.

The photo-curable composition can optionally include a variety of additives. Non-limiting examples of additives can include an impact modifier, a colorant, a thickener, a resin, a defoamer, a surfactant, a UV-absorber, a flame retardant, the like, or a combination thereof. In some specific examples, the photo-curable composition can include a colorant. The type of colorant is not particularly limited and any suitable colorant (e.g., dye, pigment, or the like, or a combination thereof) can be used in the photo-curable composition. In some additional specific examples, the photo-curable composition can include an impact modifier. The type of impact modifier is not particularly limited and any suitable impact modifier (e.g., liquid rubber, core-shell rubber particles, or the like, or a combination thereof) can be used in the photo-curable composition.

The photo-curable composition can have a variety of viscosities, depending on the application. Typically the photo-curable composition can have a shear viscosity of less than 1 Pa·s at 100° C. at a shear rate of 50 $s^{-1}$. In some additional examples, the photo-curable composition can have a shear viscosity of less than 1 Pa·s at 80° C. at a shear rate of 50 $s^{-1}$. In still additional examples, the photo-curable composition can have a shear viscosity of less than 1 Pa·s at 70° C. at a shear rate of 50 $s^{-1}$.

The present disclosure also describes a method of manufacturing a photo-curable composition. Generally, the method can include combining a photo-curable resin as described herein with a photoinitiator as described herein. The photo-curable resin can be prepared by combining a first prepolymer, a second prepolymer, and a reactive diluent.

The first prepolymer can be prepared in a variety of ways. In some examples, the first prepolymer can be prepared by combining the cycloaliphatic diisocyanate and the isocyanate-reactive component to form a first product. The isocyanate-reactive component can typically be added slowly to the cycloaliphatic diisocyanate to minimize exotherm and to narrow the molecular weight distribution. The first product can be combined with the hydroxy-functional (meth) acrylate to form the first prepolymer. In other examples, the first prepolymer can be prepared by combining the cycloaliphatic diisocyanate with the hydroxy-functional (meth) acrylate to form an isocyanate-terminated (meth)acrylate. The isocyanate-terminated (meth)acrylate can then be combined with the isocyanate-reactive component to form the first prepolymer.

The second prepolymer can also be prepared in a variety of ways. In some examples, the second prepolymer can be prepared by combining the (meth)acrylate and the polyactive-hydrogen compound under conditions suitable to form a di(meth)acrylate-functionalized polyactive-hydrogen compound (e.g., HEMA-PTMG-HEMA, for example). In other examples, the second prepolymer can be prepared by combining a diisocyanate with a (meth)acrylate to form an isocyanate-terminated (meth)acrylate. The isocyanate-terminated (meth)acrylate can be combined with a polyactive-hydrogen compound to form the second prepolymer. In still additional examples, the second prepolymer can be formed by combining a diisocyanate with a polyactive-hydrogen compound to form a second product. The polyactive-hydrogen compound can typically be added slowly to the diisocyanate to minimize exotherm. The second product can be combined with a (meth)acrylate to form the second prepolymer.

The first prepolymer and the second prepolymer can typically be mixed homogeneously with the reactive diluent to form the photo-curable resin. A photoinitiator can be added to the photo-curable resin to form a photo-curable composition. Prior to photo-curing, the photo-curable composition can optionally be heated to a temperature suitable for photo-curing. In other examples, where photo-curing is intended to be performed at ambient temperature or below, heating may not be performed. In some examples, the prepolymers may become more miscible as the temperature is increased.

The present disclosure also describes a crosslinked material prepared by curing the photo-curable composition and a method of manufacturing the same. In further detail, the photo-curable composition can be exposed to suitable electromagnetic radiation to at least partially crosslink the photo-curable composition to form at least a portion of a crosslinked material.

In some examples, the crosslinked material can have a transparent or translucent appearance. In some specific examples, the crosslinked material can have a transparency or % transmission of greater than or equal to 75% transmission at room temperature based on ASTM D1003 using a film having a thickness of 0.3 mm. In other examples, the crosslinked material can have a transparency or % transmission of greater than or equal to 80% transmission at room temperature. In still additional examples, the crosslinked material can have a transparency or % transmission of greater than or equal to 85% transmission at room temperature.

The present disclosure also describes a method of manufacturing a crosslinked material. In some examples, the method can include applying (e.g., casting, coating, painting, rolling, dipping, spraying, depositing, etc.) the photo-curable composition as described herein on at least a portion of a substrate. Any suitable substrate can be employed, such as wood, plastic, ceramic, metal, glass, etc. The photo-curable composition can be cured (e.g., exposed to electromagnetic radiation sufficient to induce photopolymerization) to form a crosslinked material on the substrate, or, in other words, a coated substrate including a coating of the crosslinked material.

In some additional examples, the method of manufacturing the crosslinked material can be or include an additive manufacturing method. Additive manufacturing methods refer to methods where a product is manufactured based on a 3D object model (e.g., a CAD model, for example) by adding material together, such as by depositing material, joining material, solidifying material, or a combination thereof, typically in a layer-by-layer manner. In some specific examples, the additive manufacturing method can be or include stereolithography, digital light processing, continuous liquid interface production, or the like. Other suitable additive manufacturing methods may also be used. Additionally, other suitable non-additive manufacturing methods may also be used to prepare the crosslinked material.

The photo-curable composition can typically have a shear viscosity of less than 1 Pa·s at 100° C. at a shear rate of 50 s$^{-1}$. Thus, for coating and additive manufacturing methods employing photopolymerization, the photo-curable compositions described herein can be applied as a film/coating or printed as a 2D or 3D object at relatively low temperatures. For example, in some cases, the photo-curable composition can be applied or printed at a temperature of less than 100° C. In still additional examples, the photo-curable composition can be applied or printed at a temperature of less than 90° C., less than 80° C., less than 70° C., less than 60° C., or less than 50° C. In some specific examples, the photo-curable composition can be applied or printed at a temperature of from 20° C. to 100° C. In some additional examples, the photo-curable composition can be applied or printed at a temperature of from 20° C. to 60° C., or from 20° C. to 40° C.

Additionally, in some cases, curing (e.g., exposing to electromagnetic radiation sufficient to induce photopolymerization) can also be performed at relatively low temperatures. In some specific examples, (e.g., in DLP printing, for example) curing and printing can be performed in the same step. In other examples, applying/printing and curing can be performed sequentially (e.g., in applying a coating to a substrate and subsequently curing the coating to form a coated substrate). In some examples, curing can be performed at a temperature of less than 100° C. In still additional examples, curing can be performed at a temperature of less than 90° C., less than 80° C., less than 70° C., less than 60° C., or less than 50° C. In some specific examples, curing can be performed at a temperature of from 20° C. to 100° C. In some additional examples, curing can be performed at a temperature of from 20° C. to 60° C., or from 20° C. to 40° C.

In some examples, the method of manufacturing can include introducing the photo-curable composition to a container. The container can be positioned to allow the photo-curable composition to sufficiently contact or cover a substrate or a build platform. The portion of the substrate or build platform that is contacted or covered with the photo-curable composition can depend on the direction(s) from which the photo-curable composition will be exposed to polymerizing electromagnetic radiation.

As used herein, "polymerizing electromagnetic radiation" can include any type of electromagnetic radiation that is suitable to facilitate or induce photopolymerization of the photo-curable composition. In some examples, the polymerizing electromagnetic radiation can be or include ultraviolet electromagnetic radiation (e.g., electromagnetic radiation with a wavelength from 10 nm to 400 nm). In some examples, the polymerizing electromagnetic radiation can be or include visible electromagnetic radiation (e.g., electromagnetic radiation with a wavelength from 380 nm to 750 nm). In some examples, the polymerizing electromagnetic radiation can be or include infrared electromagnetic radiation (e.g., electromagnetic radiation with a wavelength from 700 nm to 1 mm).

The polymerizing electromagnetic radiation can be applied to the photo-curable composition for an amount of time that is suitable to photopolymerize the photo-curable composition to form the crosslinked material. The amount of time can depend on the wavelength of the electromagnetic radiation, the intensity of the electromagnetic radiation, the thickness of the photo-curable composition, and the like. In some examples, the polymerizing electromagnetic radiation can be applied to the photo-curable composition in multiple doses, such as in a plurality of doses to a single layer, or in one or more doses to each of a plurality of layers or segments, or the like, or a combination thereof to form the crosslinked material.

Where the photo-curable composition is applied via additive manufacturing, the photo-curable composition can be printed based on a 3D object model to form a 3D crosslinked material. For example, based on the 3D object model for the crosslinked material, the photo-curable composition can be applied to a build platform and selectively exposed to polymerizing electromagnetic radiation to form a crosslinked interface layer that interfaces with the build platform. Based on the 3D object model, additional photo-curable composition can be applied to the interface layer (and/or additional crosslinked layers) and selectively exposed to polymerizing electromagnetic radiation to form one or more additional crosslinked layers until the 3D object is complete based on the 3D object model. In some examples, applying additional photo-curable composition to the interface layer and/or additional crosslinked layer(s) can include moving the build platform by a distance of from ≥1 μm to ≤2000 μm to apply additional photo-curable composition to the crosslinked interface layer and/or additional crosslinked layer(s). In some examples, applying additional photo-curable composition to the interface layer and/or additional crosslinked layer(s) can include depositing photo-curable composition to the interface layer and/or additional crosslinked layer(s) with or without moving the build platform.

Curing the photo-curable composition can form a crosslinked material including a co-crosslinked polymeric network including a first polymeric network having a first Tg and a second polymeric network having a second Tg. The first polymeric network can include crosslinked first prepolymer and reactive diluent. The first Tg can typically be greater than 80° C. based on dynamic mechanical analysis at a heating ramp of 3° C./min and a frequency of 1 Hz as loss modulus (E″) peak. In still additional examples, the first Tg can be greater than 100° C., or greater than 120° C. based on dynamic mechanical analysis at a heating ramp of 3° C./min and a frequency of 1 Hz as loss modulus (E″) peak.

The second polymeric network can include crosslinked second prepolymer and reactive diluent. The second Tg can typically be less than −40° C. based on dynamic mechanical analysis at a heating ramp of 3° C./min and a frequency of 1 Hz as loss modulus (E″) peak. In still additional examples, the second Tg can be less than −50° C., or less than −60° C. based on dynamic mechanical analysis at a heating ramp of 3° C./min and a frequency of 1 Hz as loss modulus (E″) peak.

The crosslinked material can have a variety of mechanical properties. In some examples, the crosslinked material can have a yield strain of greater than or equal to 5% based on tensile test ASTM D638, type 4 sample, using 50 mm/min pulling speed under ambient conditions. In still additional examples, the crosslinked material can have a yield strain of greater than or equal to 6% or 8% based on ASTM D638, type 4 sample, using 50 mm/min pulling speed under ambient conditions.

In some additional examples, the crosslinked material can have an elastic modulus of greater than or equal 900 MPa based on ASTM D638, type 4 sample, using 50 mm/min pulling speed under ambient conditions. In still additional examples, the crosslinked material can have an elastic modulus of greater than or equal to 1000 MPa, greater than or equal to 1200 MPa, or greater than or equal to 1500 MPa based on ASTM D638, type 4 sample, using 50 mm/min pulling speed under ambient conditions.

In some further examples, the crosslinked material can have a tensile stress at break of greater than or equal 30 MPa based on ASTM D638, type 4 sample, using 50 mm/min pulling speed under ambient conditions. In still further examples, the crosslinked material can have a tensile stress at break of greater than or equal to 35 MPa or greater than or equal to 40 MPa based on ASTM D638, type 4 sample, using 50 mm/min pulling speed under ambient conditions.

In some additional examples, the crosslinked material can have elongation at break of greater than or equal 15% based on ASTM D638, type 4 sample, using 50 mm/min pulling speed under ambient conditions. In still additional examples, the crosslinked material can have an elongation at break of greater than or equal to 20%, greater than or equal to 25%, or greater than or equal to 30% based on ASTM D638, type 4 sample, using 50 mm/min pulling speed under ambient conditions.

In some specific examples, the crosslinked material can be a 3D printed object. The 3D printed object can be formed by a variety of 3D printing methods. In some specific examples, the 3D printing method can be or include digital light processing (DLP).

In some further examples, the 3D printed object can form at least a portion of a medical device. Non-limiting examples of medical devices can include an orthodontic appliance (e.g., a dental aligner, a dental retainer, a surgical guide, or the like), an auditory appliance (e.g., a hearing aid, a cochlear implant, or the like), an orthopedic appliance (e.g., a brace, a cast, a cranial plate, a prosthesis, or the like). In some specific examples, the 3D printed object can be or include a dental aligner, a surgical guide, a hearing aid, or a cochlear implant.

EXAMPLES

Materials Used in the Examples

| | |
|---|---|
| DIOL A | 3-Methyl-1,5-pentanediol (1,5-MPD) |
| DIOL B | 1,4-Butanediol (1,4-BDO) |

-continued

| | |
|---|---|
| DIOL C | 4,8-Bis(hydroxymethyl)tricyclo[5.2.1.02,6]decane (DCPDM) |
| DIOL D | 1,9-Nonanediol |
| DIOL E | DESMOPHEN C2202, commercially available from COVESTRO |
| DIOL F | DESMOPHEN PE225B, commercially available from COVESTRO |
| DIOL G | DESMOPHEN C1200, commercially available from COVESTRO |
| DIOL H | ARCOL PPG 2000, commercially available from COVESTRO |
| DIOL I | VELVETOL H2000, commercially available from ALLESSA |
| DIOL J | Poly(tetrahydrofuran) (PTMG) 1000 |
| DIOL K | PTMG 2000 |
| DIOL L | PTMG 2900 |
| ACRYLATE A | Hydroxyethyl methacrylate (HEMA) |
| ACRYLATE B | Hydroxyethyl acrylate (HEA) |
| ACRYLATE C | PLACCEL FM1, commercially available from DAICEL |
| ACRYLATE D | Isobornyl methacrylate (IBOMA) |
| ACRYLATE E | Isobornyl acrylate (IBOA) |
| ACRYLATE F | Cyclohexyl methacrylate (CHMA) |
| ACRYLATE G | 4-tert-butylcyclohexyl methacrylate (t-BuCHMA) |
| ISOCYANATE A | Isophorone diisocyanate (IPDI) |
| ISOYCANATE B | 4,4'-diisocyanato dicyclohexylmethane ($H_{12}MDI$) |

Example 1— Synthesis of UA Prepolymers

Solid diol samples were heated in an oven at 60° C. overnight before use. A 10 wt % catalyst (e.g. dibutyltin dilaurate) solution in ethyl acetate, a 10 wt % phenothiozine solution in ethyl acetate, and a 5 wt % butylated hydroxy-toluene (BHT) solution in ethyl acetate were prepared respectively for use in the prepolymer synthesis. At room temperature, diol was mixed in ethyl acetate in a three neck reactor fitted with a reflex condenser, a thermocouple, and mechanical stirrer until a homogeneous solution was achieved. The catalyst (100 ppm) solution was added into the mixture. The stirring rate was set at 500 rpm and reaction was blanketed with nitrogen. After raising the temperature to 60° C., diisocyanate was added dropwise into the reactor within approximately 15 minutes. A dry ice bath was used to cool the reactor to maintain the solution temperature of lower than 70° C. After 1 hour, the NCO content was titrated against the NCO target. If the target was not achieved, the reaction was continued for an additional 30 minutes until reaching the target. Then, phenothiozine (50 ppm) and additional catalyst (400 ppm) were added into the reactor. Hydroxy-functional (meth)acrylate was added into the solution within 15 min. NCO content was titrated after 60 min and the reaction was stopped once the NCO content reached less than 0.2 wt %. The reaction was cooled down to room temperature. NCO was finally titrated and BHT (100 ppm) was added to the solution. In the synthesis, the solvent can be replaced by the reactive diluent.

TABLE 1

Soft Segment Prepolymers

| Prepolymer | Diol | Isocyanate | (Meth)acrylate | NCO/OH Index | Theoretical Mn (g/mol) |
|---|---|---|---|---|---|
| S1 | DIOL E | ISOCYANATE A | ACRYLATE A | 2.0 | 2610.2 |
| S2 | DIOL J | ISOCYANATE A | ACRYLATE A | 2.0 | 1692.8 |
| S3 | DIOL G | ISOCYANATE A | ACRYLATE A | 2.0 | 2733.8 |
| S4 | DIOL K | ISOCYANATE A | ACRYLATE A | 2.0 | 2712 |
| S5 | DIOL F | ISOCYANATE A | ACRYLATE A | 2.0 | 2958.4 |
| S6 | DIOL K | ISOCYANATE A | ACRYLATE C | 2.0 | 2939.8 |
| S7 | DIOL L | ISOCYANATE A | ACRYLATE A | 2.0 | 3608.6 |
| S8 | DIOL H | ISOCYANATE A | ACRYLATE A | 2.0 | 2708.4 |
| S9 | DIOL I | ISOCYANATE A | ACRYLATE A | 2.0 | 2744.8 |
| S10 | DIOL L | ISOCYANATE B | ACRYLATE A | 2.0 | 3689 |
| S11 | DIOL K/A (6:1 Ratio) | ISOCYANATE A | ACRYLATE A | 2.0 | 1319.6 |

TABLE 2

Hard Segment Prepolymers

| Prepolymer | Diol | Isocyanate | (Meth)acrylate | NCO/OH Index | Theoretical Mn (g/mol) |
|---|---|---|---|---|---|
| H1 | DIOL C | ISOCYANATE A | ACRYLATE A | 2.0 | 904.8 |
| H2 | DIOL A | ISOCYANATE A | ACRYLATE A | 1.5 | 1169 |
| H3 | DIOL A | ISOCYANATE A | ACRYLATE A | 2.0 | 826.6 |
| H4 | DIOL D | ISOCYANATE A | ACRYLATE A | 2.0 | 868.8 |
| H5 | DIOL B | ISOCYANATE A | ACRYLATE A | 2.0 | 798.6 |
| H6 | DIOL A | ISOCYANATE A | ACRYLATE B | 2.0 | 798.6 |

Example 2— Film Preparation and Evaluation

All prepolymers were synthesized in ethyl acetate at 75 wt % and were subsequently mixed with reactive diluent and photo-initiators (3 wt % based on prepolymer solid) using a speed mixer and cast into 400 micron wet films and cured using a Liberty conveyor UV oven. UV cure conditions are 200 W/in 105 amps: 14 fpm (1530 mJ/cm$^2$) double pass; Post thermal cure after drying under ambient conditions: 80, 100, and 125° C. for 30 min each to remove the residual volatiles.

Film samples were then cut into Type 4 dog bone samples using a Die cutter. The tensile tests were measured based on ASTM D638 at 23° C. under 50% RH. Instron 5900R was used with 10 kN load cell. The pull speed was 50 mm/min.

As can be seen in Table 3, the hard segment prepolymer and reactive diluent were held constant. Various types and/or amounts of soft segment prepolymers were combined with the hard segment prepolymer and reactive diluent to determine the effect on the mechanical properties of the cross-linked material. The results of the mechanical testing can be seen in Table 4.

The soft segment prepolymers of Inventive Films 1-5 are based on low Tg polyols having an Mn>2000. These polyols are relatively hydrophobic (Hansen solubility parameter<18.9 MPa$^{1/2}$). With the same hard segment prepolymer, the low Tg soft segment prepolymers demonstrate desired tensile properties (modulus>900 MPa, tensile stress at break>30 MPa, elongation at break>15%, yield strain>5%).

Comparative Films 1-5 include soft segment prepolymer that is less hydrophobic (Hansen solubility parameter>18.9 MPa$^{1/2}$) or that has an Mn<2000 g/mol or that has a Tg greater than −40° C. Additionally, the cured films show much lower tensile elongation at break and yield point of <5%, despite showing high modulus and tensile stress. In general, Comparative Films 1-5 are also more brittle. In Comparative Film 6, the prepolymer was synthesized using a mixture of two polyols, the resulting film shows a yield point of <5% despite good mechanical properties.

TABLE 4

Results of Variation of Soft Segment Prepolymer

| Film | Modulus (MPa) | Stress at Break (MPa) | Yield Stress (MPa) | Strain at Break (%) | Yield Strain (%) |
|---|---|---|---|---|---|
| Inventive Film 1 | 1735 | 38.2 | — | 32.8 | — |
| Inventive Film 2 | 981 | 38.7 | — | 60.5 | — |
| Inventive Film 3 | 1576 | 42.9 | — | 27.1 | — |
| Inventive Film 4 | 1489 | 33.3 | 32.8 | 33.2 | 6 |
| Inventive Film 5 | 1684 | 36.2 | 37.4 | 17.2 | 5.5 |
| Comparative Film 1 | Brittle | — | — | — | — |
| Comparative Film 2 | 2041 | 43.5 | 49.8 | 6.5 | 4.1 |
| Comparative Film 3 | 2070 | 40.5 | 48 | 10.0 | 4.4 |
| Comparative Film 4 | 2272 | 51 | 58.1 | 8.9 | 4.8 |
| Comparative Film 5 | Brittle | — | — | — | — |
| Comparative Film 6 | 1735 | 31.8 | 38.4 | 18.4 | 3.9 |

As can be seen in Table 5, Inventive Films 6-9 each include different types of hard segment prepolymers with the same types of soft segment prepolymers. As can be seen in Table 6, Inventive Films 6-9 show similar tensile properties (modulus>1000 MPa, tensile stress>30 MPa, tensile elongation at break>15%, yield strain>5%).

In Comparative Films 7-8, high Tg dimethacrylate cross-linker without urethane groups was used. Comparative Films 7-8 do not show desired tensile properties. These examples clearly demonstrate the benefits of using hard segment UA prepolymers.

TABLE 3

Variation of Soft Segment Prepolymer

| Film | Hard Segment Prepolymer | Amount (wt %) | Soft Segment Prepolymer | Amount (wt %) | Reactive Diluent | Amount (wt %) |
|---|---|---|---|---|---|---|
| Inventive Film 1 | H2 | 30 | S4 | 30 | ACRYLATE D | 40 |
| Inventive Film 2 | H2 | 30 | S4 | 40 | ACRYLATE D | 30 |
| Inventive Film 3 | H2 | 35 | S4 | 30 | ACRYLATE D | 35 |
| Inventive Film 4 | H2 | 30 | S6 | 30 | ACRYLATE D | 40 |
| Inventive Film 5 | H2 | 35 | S9 | 30 | ACRYLATE D | 35 |
| Comparative Film 1 | H2 | 30 | S2 | 30 | ACRYLATE D | 40 |
| Comparative Film 2 | H2 | 30 | S5 | 30 | ACRYLATE D | 40 |
| Comparative Film 3 | H2 | 35 | S3 | 30 | ACRYLATE D | 35 |
| Comparative Film 4 | H2 | 35 | S1 | 30 | ACRYLATE D | 35 |
| Comparative Film 5 | H2 | 35 | S8 | 30 | ACRYLATE D | 35 |
| Comparative Film 6 | — | — | S11 | 60 | ACRYLATE D | 40 |

TABLE 5

Variation of Hard Segment Prepolymer

| Film | Hard Segment Prepolymer | Amount (wt %) | Soft Segment Prepolymer | Amount (wt %) | Reactive Diluent | Amount (wt %) |
|---|---|---|---|---|---|---|
| Inventive Film 6 | H3 | 30 | S7 | 30 | ACRYLATE D | 35 |
| Inventive Film 7 | H5 | 30 | S7 | 30 | ACRYLATE D | 35 |
| Inventive Film 8 | H4 | 35 | S7 | 30 | ACRYLATE D | 35 |
| Inventive Film 9 | H1 | 30 | S7 | 30 | ACRYLATE D | 35 |
| Comparative Film 7 | PEAM 645* | 21 | S4 | 30 | ACRYLATE D | 49 |
| Comparative Film 8 | DCP** | 14 | S4 | 30 | ACRYLATE D | 56 |

*PEAM 645 is a polyester acrylate/methacrylate from Design Molecules Inc
**DCP is tricyclodecane dimethanol dimethacrylate from Kowa

TABLE 6

Results of Variation of Hard Segment Prepolymer

| Film | Modulus (MPa) | Stress at Break (MPa) | Yield Stress (MPa) | Strain at Break (%) | Yield Strain (%) |
|---|---|---|---|---|---|
| Inventive Film 6 | 1440 | 36.7 | — | 19.1 | — |
| Inventive Film 7 | 1343 | 38.9 | — | 21.7 | — |
| Inventive Film 8 | 1356 | 35.4 | — | 19.9 | — |
| Inventive Film 9 | 1752 | 37.4 | 40.3 | 17 | 5.1 |
| Comparative Film 7 | Brittle | — | — | — | — |
| Comparative Film 8 | Brittle | — | — | — | — |

As can be seen in Table 7, various reactive diluents were combined with various hard segment prepolymers and soft segment prepolymers to determine the effects of the reactive diluents on mechanical properties. The results of the mechanical testing can be seen in Table 8. As can be seen from these results, while Inventive Films 10-12 used different high Tg reactive diluent in the formulation, similar desired tensile properties were demonstrated.

TABLE 7

Variation of Reactive Diluent

| Film | Hard Segment Prepolymer | Amount (wt %) | Soft Segment Prepolymer | Amount (wt %) | Reactive Diluent | Amount (wt %) |
|---|---|---|---|---|---|---|
| Inventive Film 10 | H3 | 35 | S10 | 30 | ACRYLATE G | 35 |
| Inventive Film 11 | H2 | 35 | S6 | 30 | ACRYLATE E | 35 |
| Inventive Film 12 | H2 | 35 | S6 | 30 | ACRYLATE F | 35 |

TABLE 8

Results of Variation of Reactive Diluent

| Film | Modulus (MPa) | Stress at Break (MPa) | Yield Stress (MPa) | Strain at Break (%) | Yield Strain (%) |
|---|---|---|---|---|---|
| Inventive Film 10 | 1067 | 34.9 | — | 24.7 | — |
| Inventive Film 11 | 1075 | 33.7 | — | 42 | — |
| Inventive Film 12 | 1156 | 31.7 | — | 25 | — |

Table 9 presents formulations of photo-curable resins having various molecular weights to determine the effect of molecular weight on mechanical properties of the cross-linked material. The results of the mechanical testing are presented in Table 10. As can be seen from the results, Inventive Films 13-17 and 6 used various hard segment and soft segment prepolymer structures, yet these examples showed desired tensile properties.

TABLE 9

Variation of Molecular Weight

| Film | Hard Segment Prepolymer | Amount (wt %) | Soft Segment Prepolymer | Amount (wt %) | Reactive Diluent | Amount (wt %) |
|---|---|---|---|---|---|---|
| Inventive Film 13 | H2 | 35 | S6 | 30 | ACRYLATE D | 35 |
| Inventive Film 14 | H3 | 35 | S4 | 30 | ACRYLATE D | 35 |
| Inventive Film 6 | H3 | 35 | S7 | 30 | ACRYLATE D | 35 |
| Inventive Film 15 | H2 | 35 | S6 | 25 | ACRYLATE D | 40 |
| Inventive Film 16 | H3 | 35 | S10 | 30 | ACRYLATE D | 35 |
| Inventive Film 17 | H6 | 35 | S7 | 30 | ACRYLATE D | 35 |

TABLE 10

Results of Variation of Molecular Weight

| Film | Modulus (MPa) | Stress at Break (MPa) | Yield Stress (MPa) | Strain at Break (%) | Yield Strain (%) |
|---|---|---|---|---|---|
| Inventive Film 13 | 1505 | 37 | 37.3 | 21.8 | 8.2 |
| Inventive Film 14 | 1782 | 39.3 | 41.5 | 15 | 5.1 |
| Inventive Film 6 | 1440 | 36.7 | — | 19.1 | — |
| Inventive Film 15 | 1706 | 42.5 | — | 25.1 | — |
| Inventive Film 16 | 1371 | 36.9 | — | 21.1 | — |
| Inventive Film 17 | 1299 | 30 | 30.7 | 18.7 | 5 |

Dynamic mechanical analysis (DMA) at a heating ramp of 3° C./min and a frequency of 1 Hz of Inventive Films 6 and 13 and Comparative Films 3, 4, and 6 was performed to determine the Tg of the cured hard segment prepolymer network and the cured soft segment prepolymer network after curing the respective photo-curable compositions. Each of the Inventive Films show two distinct Tg points of <−40° C. and >100° C., respectively, based on loss modulus (E") peakin DMA analysis. The Comparative Films 3 and 4 in general showed higher soft segment and lower hard segment Tg. Comparative film 6 does not show a distinct soft segment Tg and lower hard segment Tg, likely attributed to more phase mixing in the cured resin when the two polyols were combined in the synthesis.

TABLE 11

DMA Analysis

| Film | Tg (soft segment) (° C.) | Tg (hard segment) (° C.) |
|---|---|---|
| Inventive Film 6 | −58 | 148 |
| Inventive Film 13 | −50 | 133 |
| Comparative 3 | 33 | 124 |
| Comparative 4 | −21 | 134 |
| Comparative 6 | NA | 124 |

It should be understood that the above-described examples are only illustrative of some embodiments of the present invention. Numerous modifications and alternative arrangements may be devised by those skilled in the art without departing from the spirit and scope of the present invention and the appended claims are intended to cover such modifications and arrangements. Thus, while the present invention has been described above with particularity and detail in connection with what is presently deemed to be the most practical and preferred embodiments of the invention, it will be apparent to those of ordinary skill in the art that variations including, may be made without departing from the principles and concepts set forth herein.

What is claimed is:

1. A photo-curable composition, comprising:
   a photo-curable resin comprising:
      a first prepolymer having a number average molecular weight of ≤2000 g/mol, said first prepolymer being a reaction product of a first reaction mixture comprising:
         a cycloaliphatic diisocyanate,
         a hydroxy-functional (meth)acrylate, and
         an isocyanate-reactive component, and
      a second prepolymer having a number average molecular weight of 2000 g/mol to 10,000 g/mol, said second prepolymer being a reaction product of a second reaction mixture comprising:
         a (meth)acrylate, and
         a polyactive-hydrogen compound, and
      a reactive diluent comprising a (meth)acrylate monomer and/or (meth)acrylate prepolymer; and
   a photoinitiator,
   wherein the photo-curable composition has a shear viscosity of less than 1 Pa·s at 100° C. at a shear rate of 50 s$^{-1}$.

2. The photo-curable composition of claim 1, wherein the cycloaliphatic diisocyanate of the first reaction mixture comprises isophorone diisocyanate.

3. The photo-curable composition of claim 1, wherein the hydroxy-functional (meth)acrylate of the first reaction mixture comprises a $C_4$-$C_{10}$ hydroxyalkyl (meth)acrylate.

4. The photo-curable composition of claim 1, wherein the isocyanate-reactive component of the first reaction mixture comprises a $C_2$-$C_{12}$ aliphatic diol.

5. The photo-curable composition of claim 1, wherein the (meth)acrylate of the second reaction mixture comprises a $C_4$-$C_{10}$ hydroxyalkyl (meth)acrylate.

6. The photo-curable composition of claim 1, wherein the second reaction mixture further comprises a diisocyanate.

7. The photo-curable composition of claim 6, wherein the diisocyanate comprises a cycloaliphatic diisocyanate.

8. The photo-curable composition of claim 1, wherein the polyactive-hydrogen compound of the second reaction mixture has a Hansen solubility parameter of $\delta<18.9$ MPa$^{1/2}$.

9. The photo-curable composition of claim 1, wherein the reactive diluent comprises a $C_{10}$-$C_{18}$ (meth)acrylate monomer.

10. The photo-curable composition of claim 1, wherein the photo-curable resin comprises from 30 wt % to 50 wt % of the first prepolymer based on a total weight of the photo-curable resin.

11. The photo-curable composition of claim 1, wherein the photo-curable resin comprises from 25 wt % to 30 wt % of the second prepolymer based on a total weight of the photo-curable resin.

12. The photo-curable composition of claim 1, wherein the photo-curable resin comprises from 30 wt % to 40 wt % of the reactive diluent based on a total weight of the photo-curable resin.

13. A crosslinked material, comprising: the photo-curable composition of claim 1 after curing to form a co-crosslinked polymer network comprising a first polymer network having a first Tg and a second polymer network having a second Tg.

14. The crosslinked material of claim 13, wherein the first Tg is greater than 80° C.

15. The crosslinked material of claim 13, wherein the second Tg is less than −40° C.

16. The crosslinked material of claim 13, wherein the crosslinked material has % transmission of greater than or equal to 75% at room temperature based on ASTM D1003 using a film having a thickness of 0.3 mm.

17. The crosslinked material of claim 13, wherein the crosslinked material is a 3D printed article.

18. The crosslinked material of claim 17, wherein the 3D printed article forms at least a part of a medical device.

19. The crosslinked material of claim 18, wherein the medical device comprises an orthodontic appliance, an auditory appliance, or an orthopedic appliance.

20. A method of manufacturing a crosslinked material, comprising:
 exposing the photo-curable composition of claim 1 to polymerizing electromagnetic radiation to form the crosslinked material.

\* \* \* \* \*